(12) United States Patent
James (10) Patent No.: US 10,805,457 B2
(45) Date of Patent: Oct. 13, 2020

(54) APPARATUSES AND METHOD FOR CONTACTING A CALLEE

(71) Applicant: Saronikos Trading and Services, Unipessoal LDA, Funchal/Madeira (PT)

(72) Inventor: Robert James, Hatfield (GB)

(73) Assignee: Saronikos Trading and Services, Unipessoal LDA, Funchal, Madeira (PT)

( * ) Notice: Subject to any disclaimer, the term of this patent is extended or adjusted under 35 U.S.C. 154(b) by 0 days.

(21) Appl. No.: 16/064,428

(22) PCT Filed: Dec. 21, 2015

(86) PCT No.: PCT/EP2015/080727
§ 371 (c)(1),
(2) Date: Jun. 20, 2018

(87) PCT Pub. No.: WO2017/108068
PCT Pub. Date: Jun. 29, 2017

(65) Prior Publication Data
US 2019/0007552 A1 Jan. 3, 2019

(51) Int. Cl.
*H04M 3/42* (2006.01)
*H04L 12/58* (2006.01)

(52) U.S. Cl.
CPC ...... *H04M 3/42263* (2013.01); *H04L 51/043* (2013.01); *H04M 3/42059* (2013.01); *H04M 3/42374* (2013.01); *H04M 2203/655* (2013.01)

(58) Field of Classification Search
CPC ......... H04M 3/42263; H04M 3/42059; H04M 3/42374; H04L 51/043
See application file for complete search history.

(56) References Cited

U.S. PATENT DOCUMENTS

| 6,501,834 | B1 * | 12/2002 | Milewski | ............... | H04L 51/36 |
| | | | | | 379/88.17 |
| 2001/0031633 | A1 | 10/2001 | Tuomela et al. | | |
| 2002/0059527 | A1 * | 5/2002 | Pedersen | ........... | H04M 3/42382 |
| | | | | | 726/9 |

(Continued)

FOREIGN PATENT DOCUMENTS

EP 1819137 8/2007

OTHER PUBLICATIONS

International Search Report cited in PCT/EP2015/080727, dated Jul. 25, 2016. (3 pages).

*Primary Examiner* — Brandon J Miller
(74) *Attorney, Agent, or Firm* — Workman Nydegger (57) ABSTRACT

An apparatuses and a method for contacting a callee, wherein one of the apparatuses includes an input component adapted to detect a communication attempt made by a caller communication terminal to establish a connection, through a first communication channel, with a callee communication terminal which is unavailable, an output component adapted to send at least a non-availability message to the caller communication terminal, a processor configured for generating the non-availability message which includes audio routing information providing information establishing a communication, through a second communication channel, between the caller communication terminal and the callee communication terminal and/or a callee alternative communication device.

14 Claims, 5 Drawing Sheets

(56) References Cited

U.S. PATENT DOCUMENTS

| | | | |
|---|---|---|---|
| 2006/0023695 A1* | 2/2006 | Yarlagadda | H04L 29/06027 370/352 |
| 2006/0210033 A1* | 9/2006 | Grech | H04M 3/42017 379/88.19 |
| 2007/0064906 A1* | 3/2007 | Jain | H04M 3/42042 379/207.05 |
| 2010/0266111 A1* | 10/2010 | Crausaz | H04M 3/4938 379/93.29 |
| 2010/0304729 A1 | 12/2010 | Sabotta et al. | |
| 2013/0111365 A1* | 5/2013 | Chen | H04L 51/10 715/756 |
| 2016/0094708 A1* | 3/2016 | Brown | H04W 68/005 455/414.1 |

\* cited by examiner

APPARATUSES AND METHOD FOR CONTACTING A CALLEE

BACKGROUND OF THE INVENTION

1. The Field of the Invention

In its most general aspect, the present invention relates to an apparatus, a switching device, a communication terminal, and a method for managing communications in a telecommunication network; in particular, for managing phone calls when the callee terminal is unavailable through a first communication channel (e.g., because said terminal is off or outside mobile network coverage, is experiencing network roaming issues, or the like), and the callee can be reached through a second communication channel.

2. The Relevant Technology

It is known that mobile network roaming conditions vary from country to country, but voice roaming is almost always available, by making it possible to reach people all around the world through mobile phones. For this reason, it is commonly recognized that a phone call, in particular a phone calls directed to mobile terminals, is the most effective way to reach a person, especially when he/she is on a business trip or a vacation. In fact, during a business or leisure trip, it may be necessary to be reached by other people (e.g., colleagues, collaborators, relatives, etc.) via mobile phone, in order to receive updates about situations of interest, e.g., business evolution, dangerous situation occurring in your home country, or the like. But, during a trip, it is not always possible be available due to a number of reasons, e.g., the mobile phones must be switched off on almost all the airplanes and/or during immigration/customs checks, the mobile phones are usually switched off or put in a silent mode during the night in order to avoid harassing phone calls from countries in different time zones, etc. This makes the users very prone to miss phone calls; hence, said users very often use voicemail services (also called answering machine services) provided by the network operators.

The U.S. Pat. No. 8,831,574 by FRANCE TELECOM describes a solution for personalizing the unavailability message of the voicemail service heard by the caller, wherein these messages are generated on the basis of information provided by the user of the voicemail (i.e., the callee), the caller phone number (e.g., the MSISDN number), the callee position, or the like. This solution does not solve the problem of reducing the number of missed calls; in particular, it does not reduce the time spent listening all the voice messages or reading the missed-call alert (usually provided by Short Message Service—SMS), and it increases the missing opportunities. In fact, certain callers try to reach a particular callee a single time only and they never leave a message in a voicemail, e.g., a possible customer trying to contact a practitioner for the first time, embassy services trying to contact the largest number of nationals being in a specific area in the shortest time, or the like.

SUMMARY OF THE INVENTION

The present invention aims to solve these and other problems by providing a communication terminal, an apparatus and a method for managing communications in a telecommunication network.

Furthermore, this invention also provides a switching device for routing communications in a communication network through both a first and a second communication channel.

Furthermore, this invention also provides a communication terminal for accessing to both a first and a second communication channel.

The main idea of the present invention is the generation of non-presence messages comprising audio routing information providing information for establishing a communication with the callees by means of alternative communication channels (e.g., VoIP, Social network profiles, or the like).

In this way, it possible to provide the right amount of information to the callee, i.e., avoiding that the callee misses important information/contacts or overwhelmed by either voicemail messages or missed-call alert messages when he/she becomes available again. This is possible due to the fact that the callee can be reached through an alternative communication channel that is usually independent from the main one, so that the probability to reach the callee results increased.

Further advantageous features of the present invention are the subject of the attached claims.

BRIEF DESCRIPTION OF THE DRAWINGS

The features of the invention are specifically set forth in the claims annexed to this description; such characteristics will be clearer from the following description of a preferred and non-exclusive embodiment shown in annexed drawings, wherein:

DETAILED DESCRIPTION OF THE PREFERRED EMBODIMENTS

In this description, any reference to "an embodiment" will indicate that a particular configuration, structure or feature described in regard to the implementation of the invention is comprised in at least one embodiment. Therefore, the phrase "in an embodiment" and other similar phrases, which may be present in different parts of this description, will not necessarily be all related to the same embodiment. Furthermore, any particular configuration, structure or feature may be combined in one or more embodiments in any way deemed appropriate. The references below are therefore used only for simplicity's sake, and do not limit the protection scope or extension of the various embodiments.

Figure 1:
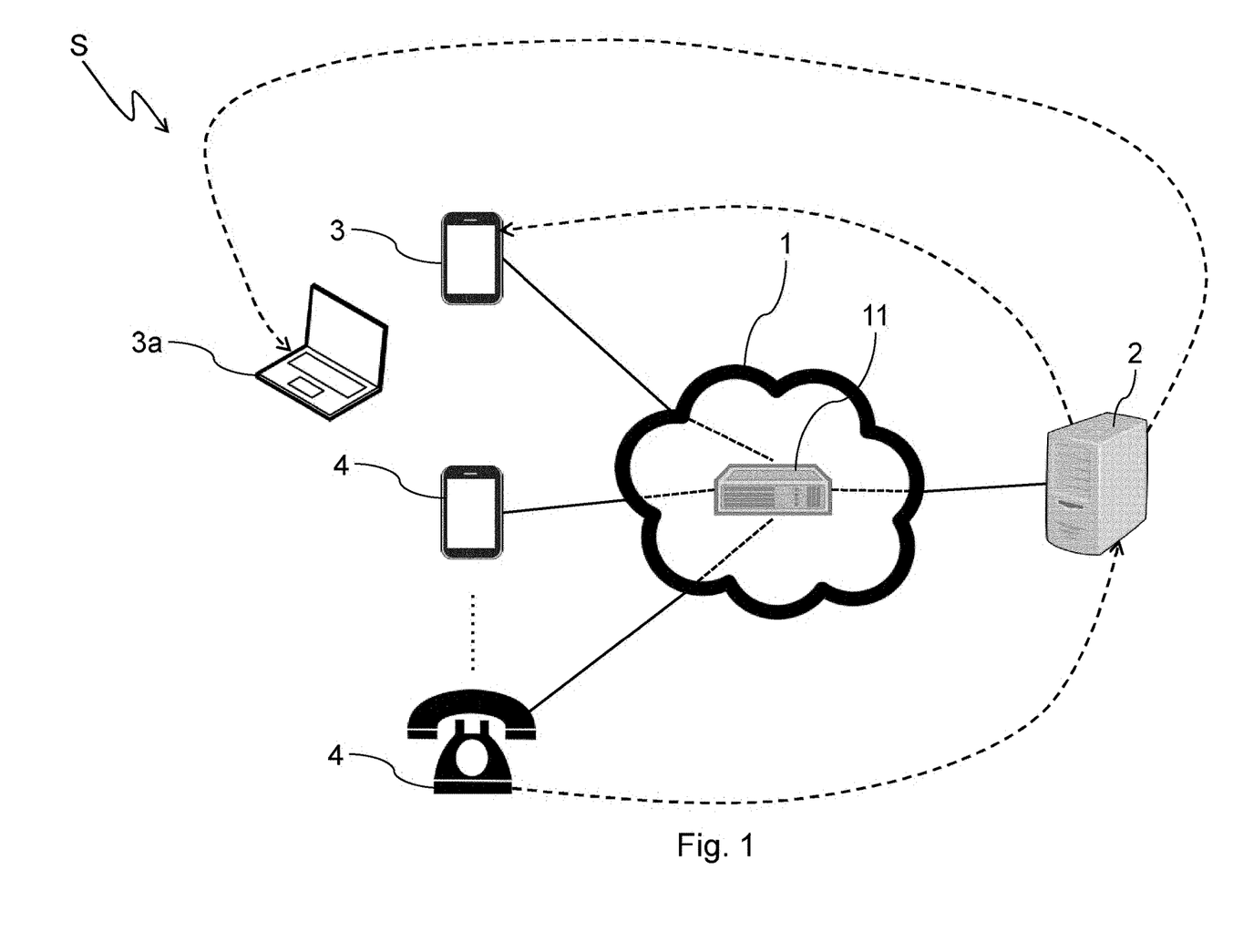
FIG. 1 shows a communication system comprising an apparatus for managing communications according to the invention and a switching device for routing communications according to the invention.

FIG. 1 shows a communication system S (e.g., a circuit-switched telephone system) comprising the following parts: a telecommunication network 1 (e.g., a circuit-switched and/or a packet-switched network), which preferably dispatches phone calls and (optionally) packet data between the different nodes of said network 1. To this purposes, said telecommunication network 1 comprises at a least a switching device 11 (e.g., a Telephone exchange, a router, or the like) configured for receiving signalling information, and processing said signalling information in order to try establishing a communication between a caller and a callee;

a messaging server 2 configured for detecting communication attempts, e.g., by receiving signalling information which will be better detailed in the following of this description;

at least one callee terminal 3 (e.g., a mobile phone), which can be unavailable through a main communication channel (e.g., a mobile network, a landline network, or the like) for several different reasons: said terminal has the mobile communication part off (the so-called "airplane-mode"), has been switched off by the user, is out of network coverage, is out of battery, has set a policy for blocking specific callers or group of, or the like;

optionally a callee alternative communication device 3a (like a laptop, a tablet, paired devices, coupled devices, devices that are capable to be synchronized with other devices based on the user identification, server based managed devices, manageable devices over cloud or the like), which is associated to at least one callee terminal 3, and is adapted to receive, through a second communication channel (e.g., an internet connection provided by the telecommunication network 1 or a different one not shown in the attached image), the communication directed to said at least one associated callee terminal 3;

one or more caller terminal 4 (e.g., a mobile or a landline terminal), which is adapted for trying to establish a communication between itself and said callee terminal 3 through the telecommunication network 1 by using a signalling protocol (e.g., Session Initiation Protocol—SIP), i.e., a set of standardized procedures executed by the terminals 4 (also called User Equipment—UE) and the various network elements of the telecommunication network 1 (e.g., the switching device 11) in order to provide the services requested by the UE (in this cases, said services preferably include at least the establishment a voice communication between the caller terminal 4, which is requesting the communication, and the callee terminal 3).

Figure 2:
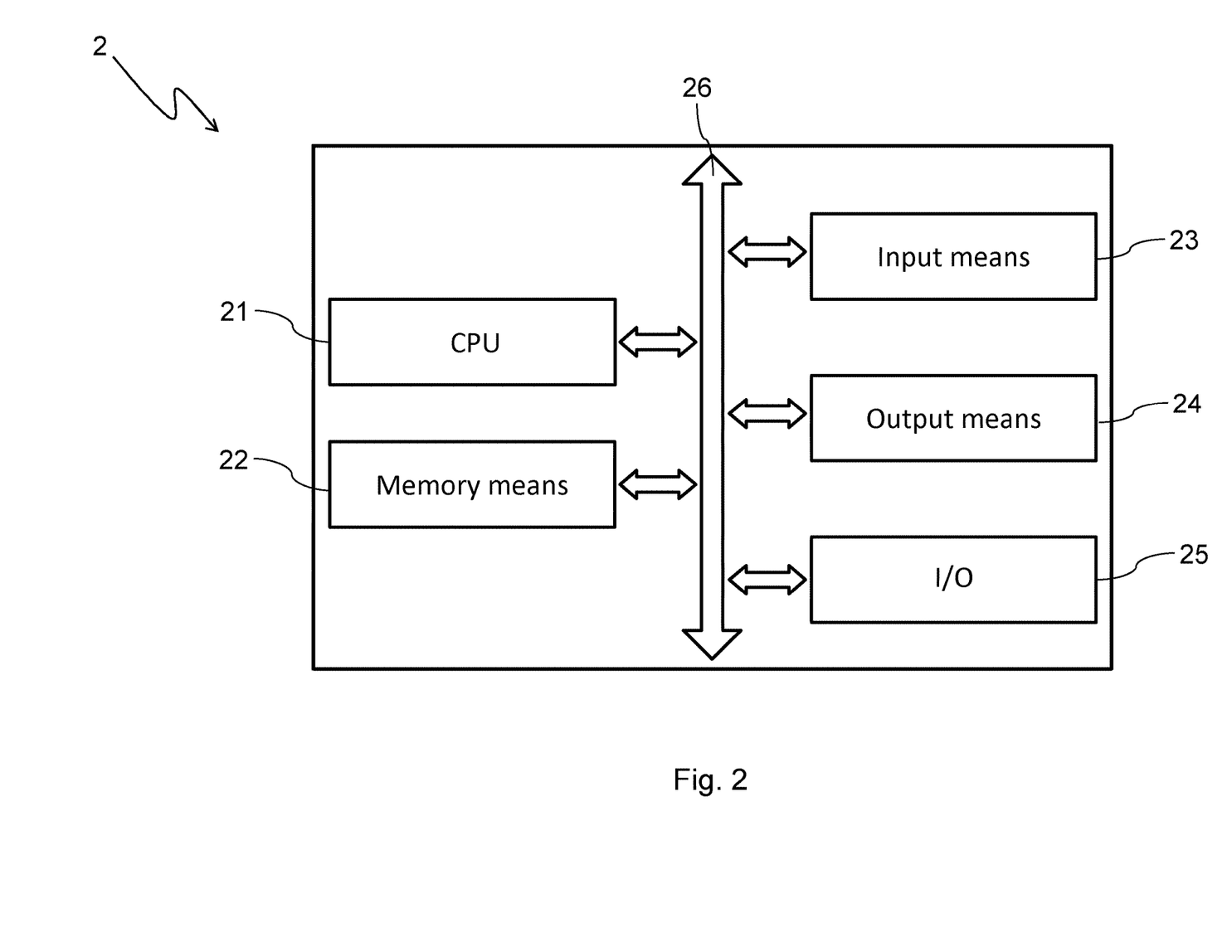
FIG. 2 shows a block diagram of the internal architecture of the apparatus for managing communications illustrated in FIG. 1.

With reference to FIG. 2, an apparatus 2 for managing communications in the telecommunication network 1 comprises the following parts:

processing means 21, like a Central Processing Unit (CPU), configured for executing a set of instruction for carrying out a method for managing communications in the telecommunication network 1 according to the invention (said method will be described in details in the following of this description);

memory means 22 containing at least message generation information allowing to determine which of the terminals 3 are available or not, which audio routing information has to be included in each non-availability message, and preferably the instructions that implement the method for managing communications in the telecommunication network 1 according to the invention;

input means 23 (e.g., a network interface), which is adapted to detect, preferably by means of the switching device 11, a communication attempt preferably from a caller communication terminal 4 that is trying to establish a connection with a callee communication terminal 3 which is unavailable through a first communication channel; such input means may for example include an adapter according to at least one of the following standards: Ethernet, USB, Firewire, Wi-Fi, or the like;

output means 24 (e.g., a network interface), which is adapted to deliver/send, through the telecommunication network 1, at least a non-availability message to the switching device 11 and/or the caller communication terminal 4 when the callee communication terminal 3 is unavailable through the main communication channel, i.e., when the terminal 3 is unreachable and/or the user of said terminal 3 has inhibited said terminal 3 to accept communications from a particular caller or a group of callers through a main communication channel (e.g., for reducing mobile roaming costs due to incoming calls from origin country, or the like); such output means may coincide with the input means 23, and may for example include an adapter according to at least one of the following standards: Ethernet, USB, Firewire, Wi-Fi, or the like;

I/O means 25, which can be used, for example, for updating the set of instruction for carrying out the method for managing communications according to the invention and/or checking the status of said apparatus 2 and/or servicing said apparatus 2; for this purpose, the I/O means 25 may comprise, for example, USB, Firewire, RS232, IEEE 1284, Ethernet, WiFi or other adapters;

a communication bus 26, which allows the exchange of information between the CPU 21, the memory means 22, the input means 23, the output means 24, and the I/O means 25.

As an alternative to using the communication bus 26, the CPU 21, the memory means 22, the input means 23, the output means 24, and the I/O means 25 can be connected by means of a star architecture.

The message generation information, which are used for generating messages, can be preferably defined from the callee by means of a SMS sent to the apparatus 2, a (Web) control dashboard configuring the apparatus 2, or the like. In this way, a user can specify an alternative communication channel on which he/she can be (easily) reached (e.g., Skype©, WhatsApp©, Messenger©, Facebook©, a customized VoIP services, or the like), and connection information that are necessary to establish a communication through said alternative communication channel (e.g., a Skype©, WhatsApp©, Messenger©, or Facebook© ID, a VoIP number, or the like); these information can then be used by the apparatus 2 for generating audio routing information as described in more details in the following of this description. The alternative source may be also data derived from a calendar, in particular from a calendar of the called user comprising different events. These events may be time and duration of meetings, place of meetings, urgency level of meetings and the like. The calendar may also be originated from the calendar of a company comprising information about the availability and events related to at least some of the employees. In this advantageous way the success rate of an attempt to communicate is dramatically increased.

For this purpose, the apparatus 2 can preferably run a computer program implementing the functionalities of (Web) server that can be reached by any communication terminals 3,4 or any alternative devices 3a accessing the communication network 1 and/or Internet.

The method for managing communications according to the invention executed by the messaging server 2 comprises the following phases:

a. a detecting phase, wherein a communication attempt made by a caller communication terminal 4, which is trying to establish a connection with a callee communication terminal 3 resulting unavailable through a first communication channel, is detected;

b. a generation phase, wherein a non-availability message is generated by means of the processing means 21, wherein said non-availability message comprises the audio routing information providing information for establishing a communication, by means of a second communication channel, with the callee communication terminal 3 and/or at least one of the callee alternative communication devices 3a;

c. an output phase, wherein the non-availability message is outputted through output means (24) as described in more details in the following of this description.

Figure 3:
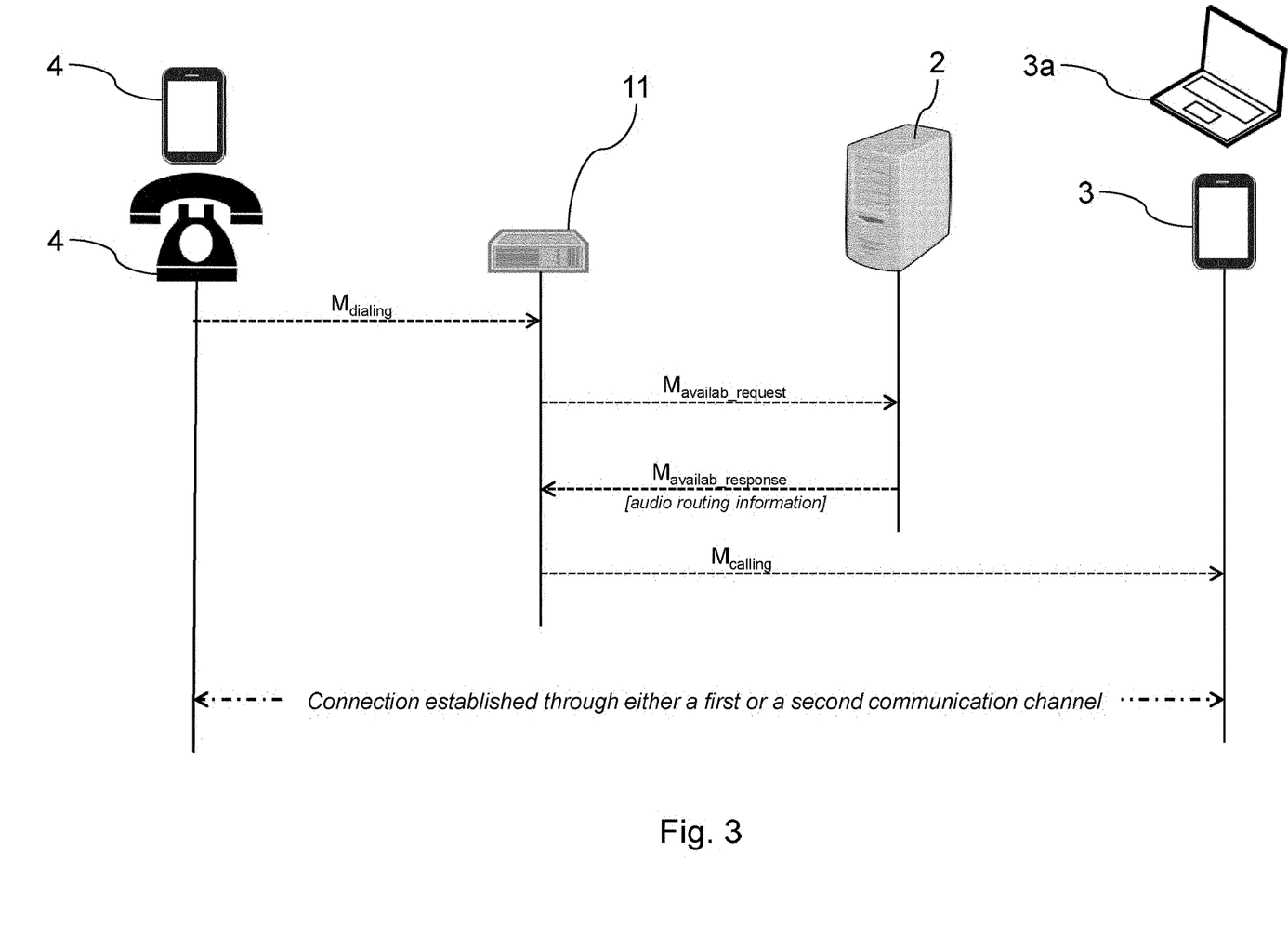
FIG. 3 shows a sequence diagram depicting a communication session establishment in which a main embodiment of the invention is involved.

With also reference to FIG. 3, a caller communication terminal 4 attempting to connect with a callee communication terminal 3 sends at least a signalling information message $M_{dialing}$ to the switching device 11, wherein said signalling information may comprise the callee/caller ID (e.g., the MSISDN number) or the like;

The switching device 11 comprises communication means (e.g., one or more network interfaces) and processing means (e.g., a CPU or the like) in signal communication with said communication means, and said switching device 11 is configured for performing the following steps:

receiving, by means of the communication means, the signalling information sent from the caller communication terminal 4;

reading the signalling information contained into it;

generating a request of availability message $M_{availab\_request}$ on the basis of said signalling information (e.g., by encapsulating at least part of said signalling information into $M_{availab\_request}$ message);

sending, by means of the communication means, said availability message $M_{availab\_request}$ to the apparatus 2 through the communication network 1;

waiting for an availability response message $M_{availab\_response}$ which contains information about the prosecution of the communication session establishment (e.g., whether the switching device 11 should continue the communication establishment through the main communication channel or the alternative one);

establishing a connection, on the basis of said audio routing information, with the callee communication terminal 3 or the callee alternative device 3a through the main communication channel or an alternative one by sending a calling message $M_{calling}$.

More in details, the availability response message $M_{availab\_response}$ may contains the audio routing information if the callee is unreachable through the main communication channel, but it is reachable through the alternative communication channel.

The audio routing information can be an audio signal, which is encoded by means of an encoder comprised in the apparatus 2, by using preferably a digital encoding standard, and contains the information for contacting the callee in an alternative way, so that the switching device 11 can (automatically or semi-automatically) perform the following steps:

receiving, by means of the communication means, the audio signal;

decoding, by means of a decoder comprised in said switching device 11', said audio signal in order to extract the audio routing information;

trying to establish a connection between the caller and the callee on the basis of said audio routing information.

More in details, the audio signal may also comprise a vocal message (e.g., "The customer is only available on Skype") combined with the audio routing information which are preferably arranged at the end or at the beginning of said audio signal.

Figure 4:
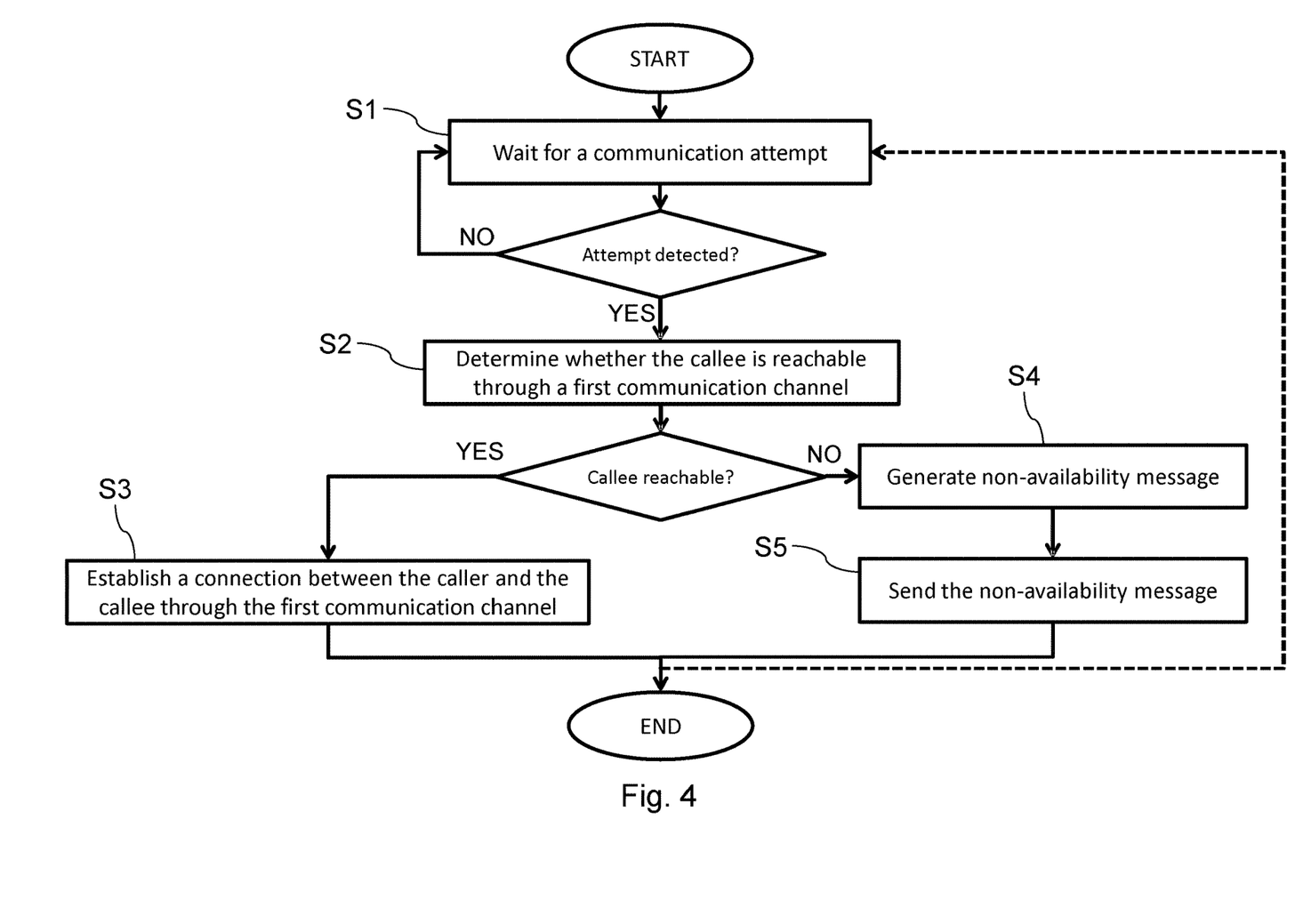
FIG. 4 shows a flow chart depicting the operation of the apparatus illustrated in FIGS. 1 and 2.

With also reference to FIG. 4, one possible mode of operation of the apparatus 2 according to the first embodiment of the invention is represented by means of a finite-state machine; said mode of operation can be implemented through software, e.g., the previously described program, which is then executed by the processing means 21 and/or by a programmable hardware component (e.g., a CPLD or a FPGA or the like) or a specially developed one. The finite-state machine comprises the following states:

a stand-by state S1, wherein the apparatus 2 waits to detect a communication attempt through the input means 23;

a determination state S2, wherein the apparatus 2 determines whether the callee terminal 3 can be reached through the main communication channel, e.g., by checking the callee and/or caller phone number against the message generation information;

a connection state S3, wherein the apparatus 2 generates one or more configuration messages, and outputs said message(s) in order to establish a communication between the caller and the callee through the main communication channel;

a generation state S4, wherein the apparatus 2 generates a non-availability message containing at least audio routing information, i.e., it executes phases b.;

an output state S5, wherein the apparatus 2 sends the non-availability message to the switching device 11, i.e., it executes phases c.

When the apparatus 2 is in operating condition, said apparatus 2 enters the state S1, where it stays until the input means 23 receive the request of availability message $M_{availab\_request}$ sent by a switching device 11 (phase a.), i.e., detect a communication attempt; when this happens, the machine enters the state S2. In the state S2, the computing means 21 determine whether the callee is reachable through the main communication channel; in case the computing means 21 determine that the caller is reachable through the main communication channel, the apparatus 2 enters in the state S3, otherwise it enters in the state S4. After a non-availability message is generated (state S4), the apparatus 2 enters in the state S5, so that said message is sent to the switching device 11.

After the apparatus 2 has either allowed the communication between the caller and the callee or sent the non-availability message to the switching device 11, the apparatus 2 will end its operation or, as highlighted by the dashed lines in FIG. 4, will enter again the state S1, ready for a new operating cycle.

As already mentioned above, the non-availability message produced in the generation phase b. may comprises the audio routing information providing information to allow contacting the callee in an alternative manner, e.g., via VoIP or the like. More in details, the non-availability message can contain audio routing information defining the alternative way (manner) in which the callee can be contacted. Said audio routing information can be generated by the computing means 21 on the basis of the status information and/or defined from the callee by means of a SMS sent to the apparatus 2, a (Web) control dashboard configuring the apparatus 2, or the like.

The audio routing information can be encoded by using preferably a digital encoding standard (e.g., ASCII code or the like), and sent to the switching device 11 by using preferably a signalling protocol (e.g., Session Initiation Protocol—SIP, or the like). Said audio routing information contains the information for contacting the callee in an alternative way (e.g., Skype/Messenger/WhatsApp ID or the like), so that the switching device 11 can (automatically) perform the following steps:

- receive the audio routing signal through a communication means (e.g., one or more communication interfaces, not shown in the attached figures);
- decode said audio routing signal, by means of computing means (e.g., a processor not shown in the attached figures), in order to determine which alternative communication channel has to be used and how to contact the callee through said alternative communication channel;
- trying to reach the callee on the basis of said audio routing information, i.e., trying to reach a callee through the alternative communication channel in order to establish a connection between the caller communication terminal 4 and the callee communication terminal 3 and/or the callee alternative device 3*a*.

In this main embodiment, the switching devices may be preferably configured for accessing to the Internet by means of its communication means (not shown in the attached figures), in order to establish connection between a caller communication device, preferably a mobile or landline phone, and a callee communication terminal 3, preferably a mobile or landline phone, and/or the callee alternative device 3*a* (e.g., a laptop, a mobile device, a tablet, a mobile phone, or the like) on which a software like Skype©, Messegner©, WhatsApp© can run.

In this way, it is possible to reach a callee when he/she is experiencing a particular situation, such as a trip in a foreign country, an emergency situation, or the like, without the caller communication terminal 4 accesses directly to an alternative communication channel. In fact, Internet access is present almost in every place around the world, since it is usually provided by means of wireless access points (compliant to IEEE 802.11 and/or 802.16 communication standards), which are positioned in specific locations or can be positioned on airplanes, trains, buses, flying drones, or the like. An Internet access may also be available after a earthquake, a tsunami, or the like, since the wireless access points of a communication system can be easily (re)configured for creating a mesh network so as to increase the robustness of a communication network; in this particular scenario, the apparatus 2 according to the invention can be employed for allowing connections between a mobile or landline communication terminal 4 accessing a communication network 1 and another communication terminal 3,3*a* which is unable to access directly said communication network 1, but is capable to access the public Internet or another data service from a rescue communication network that is activated when emergency situations occur.

Furthermore, the switching machine 11 can be configured for trying to establish a connection between the caller terminal 4 and the callee 3 through an alternative communication channel selected between a plurality of alternative communication channels, so that to increase the probability to reach the callee. In particular, an user can preferably specifies different VoIP services (and the associated IDs) on which he/she is reachable. The user can also put said alternative communication channel in a list having a particular order, so as to specify the preferred order that the switching machine 11 should follow.

In this way, it is possible to provide the proper level of information to the callee by giving to the caller 11 more alternative ways to contact the callee (e.g., through different VoIP services), so that no voice mail message should be left.

Furthermore, both the switching device 11 and the apparatus 2 can be replaced by a single device. In this configuration, the messages $M_{availab\_request}$ and $M_{availab\_response}$ may be exchanged between at least two distinct threads running on the same machine, and implementing the functions of the switching device 11 and the apparatus 2, respectively. This makes possible to avoid communications between the switching device 11 and the apparatus 2 through the communication network 1, so that the latency produced by the communication between the switching device 11 and the apparatus 2 is reduced.

In this way, it is possible to provide the proper level of information to the callee, since the caller, who is attempting the communication, does not experience a too long dialing time, and then is not discouraged to contact the callee.

Furthermore, the audio routing information produced in the generation phase b. can be generated also on the basis of status information retrieved from an alternative information source providing information about the callee, e.g., Instant messaging status, a social network profile (like Facebook©, Twitter©, etc.), or the like. More in details, the computing means 21 can be configured for retrieving, during the generation phase b., status information associated to the callee from the Internet, preferably from a social network profile associated to the callee, and generating audio routing information messages also on the basis of said status information.

For example, if a person is in a foreign country and becomes available on Skype©, the switching apparatus 2 generates non-availability message comprising an audio routing information which can be used by the switching apparatus 11 for establishing a connection between the caller mobile terminal 4 and the callee devices 3,3*a* through Skype©; hence, when a caller tries to contact this person and said person results unavailable to this caller through the mobile network (e.g., because the mobile terminal 3 is off or the callee does not want receive calls from the mobile network due to high roaming costs), the computing means 21 can retrieve the Skype© availability status, determine whether the callee is available on the basis of said availability status, and, if the user is available on Skype©, generate a non-availability message comprising audio routing information like the callee's preference to be contacted on Skype© and the callee's Skype ID.

In this way, it is possible to provide the proper level of information to the callee, because the caller is deviated on an alternative communication channel only when the callee is really available on said communication channel, so that the caller may decide either retrying contacting the callee later or eventually leaving a message in the voice mail with an higher level of confidence in the functioning of the communication systems.

Figure 5:
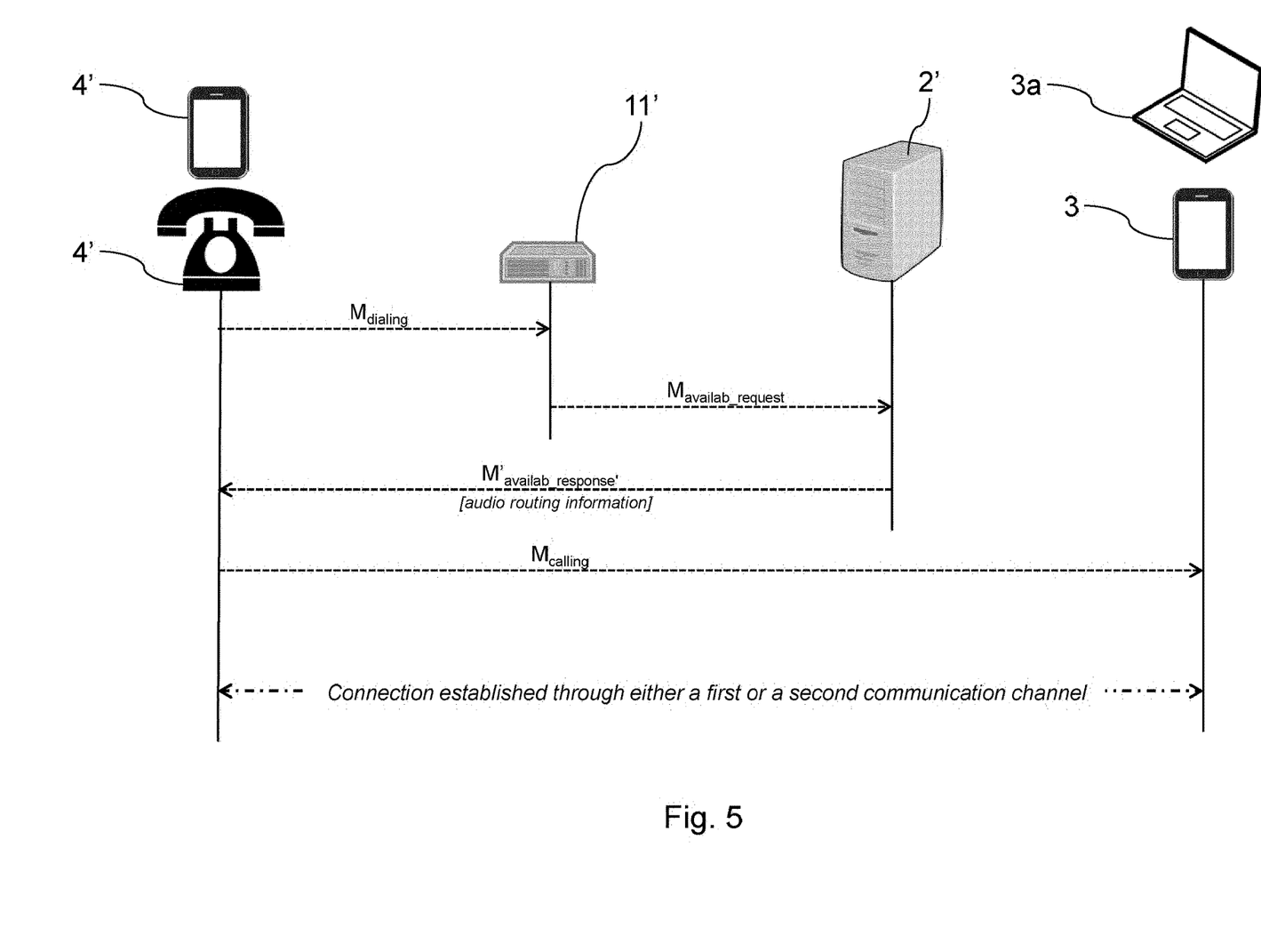
FIG. 5 shows a sequence diagram depicting a communication session establishment in which a second embodiment of the invention is involved.

FIG. 5 shows a first variant of the invention; for simplicity, the following description will only highlight those parts which make this and the next variants different from the above-described main embodiment; for the same reason, wherever possible the same reference numerals, with the addition of one or more apostrophes, will be used for indicating structurally or functionally equivalent elements.

In a second embodiment of the present invention, a communication system similar to the communication system S of the previous embodiment comprises at least a caller communication terminal 4', a switching device 11' and an apparatus 2' which are similar to the ones of the main embodiment, but are configured in a different way.

More in details, the switching device 11' is configured only for generating a request of availability message $M_{availab\_request}$ on the basis of said signalling information (e.g., by encapsulating at least part of said signalling information into $M_{availab\_request}$ message), i.e., said switching device 11' does not (directly) establish a communication with the callee communication terminal 3 and/or the callee alternative device 3a; for this purpose, the apparatus 2' is configured for generating a response message $M_{availab\_response}'$, which contains the same information of the response message $M_{availab\_response}$ generated by the apparatus 2 of the main embodiment, and is addressed to the caller communication terminal 4' instead of to the switching device 11'. The switching device 11' may preferably forward the response message $M_{availab\_response}$ to the caller communication terminal 4' through the phone audio channel.

The caller communication terminal 4' is configured for performing the following steps:
 receiving the $M_{availab\_response}'$ message;
 decoding, by means of a decoder comprised in said terminal 4', the audio routing information if it is present within said $M_{availab\_response}'$ message;
 establishing a connection, on the basis of said audio routing information, with the callee by sending a calling message $M_{calling}$.

All these steps are performed by a mobile terminal 4' or a landline phone terminal 4' (e.g., a PABX, an IP phone, or the like); hence, the switching device 11' can be a switching device according to the state of the art. Said callee terminal 4' is configured for executing a software implementing all the steps of the method according to the invention; the set of instructions of said software can be stored into the memory of said terminal by the manufacturer, or can be downloaded from a server via a communication network (e.g., by downloading through the Internet an application from an online shop, such as Google Play©, App Store, or the like) and then stored/installed in the memory of said terminal 4'.

More in details, the communication terminal 4' according to this embodiment of the invention may access to both a first and a second communication channel, and comprises the following parts:
 a communication interface apt for attempting communication with the callee communication terminal 3;
 processing means in signal communication with said input means 23, and configured for performing the following steps:
 receiving a non-availability message comprising audio routing information generated by the apparatus 2' when the callee communication terminal (3) is unavailable, wherein said non-availability message provides information for establishing a communication, through the second communication channel, with the callee communication terminal 3 and/or the callee alternative communication device 3a;
 establishing a connection, through the second communication channel, with the callee communication terminal 3 and/or the callee alternative communication device 3a on the basis of the received audio routing information.

For example, if a user wants to be contacted by a certain caller only via Skype©, said user can configure the apparatus 2 (by means of a SMS, a web dashboard, or the like) to generate audio routing information, encoded by means of a digital encoder, containing his/her Skype ID and specifying that he/she wants to be contacted on Skype®; in this way, when said caller tries to communicate with the user, the caller terminal 4 receives audio routing information, decodes said audio routing information getting the Skype ID and the user's wish to be contacted on Skype© only, and contacts said user (the callee) through Skype© by using the callee's Skype ID.

In this way, it is possible to provide the proper level of information to the callee by giving to the caller an alternative way to contact the callee, so that no voice mail message should be left. Furthermore, this solution does not result advantageously influenced by the setting used by the different telecommunication operators all over the world, since the audio routing information is encoded in an audio signal, which can be sent across any phone line without limitations.

In the two previously described embodiments, the communication network is a public mobile and/or landline phone network, whereas and the callee/caller communication terminals are mobile or landline terminals; it is evidenced that this invention can be also applied to fully packet-switched communication networks (e.g., public Internet, private data networks, or the like) and to Voice over IP (VoIP) terminals (e.g., Personal Computer, tablet, smartphone, or the like) that may run a software (e.g., Skype©, Google Hangouts©, or the like) implementing communication terminal functionalities.

The present description has tackled some of the possible variants, but it will be apparent to the man skilled in the art that other embodiments may also be implemented, wherein some elements may be replaced with other technically equivalent elements. The present invention is not therefore limited to the explanatory examples described herein, but may be subject to many modifications, improvements or replacements of equivalent parts and elements without departing from the basic inventive idea, as set out in the following claims.

The invention claimed is:

1. An apparatus for managing communications in a telecommunication network, wherein communication terminals are configured for communicating through at least a first channel, the apparatus comprising:
 input means adapted for detecting a communication attempt made by a caller communication terminal to establish a connection, through the first communication channel, with a callee communication terminal which is unavailable,
 output means adapted for sending at least a non-availability message to a switching apparatus,
 processing means in signal communication with said input means and said output means, and configured for generating said non-availability message,
 wherein the non-availability message issued by the output means comprises audio routing information providing information that allows the switching apparatus to automatically establish, without input from the caller communication terminal, a communication between the caller communication terminal and the callee communication terminal and/or a callee alternative communication device through a second communication channel;
 wherein said second communication channel is a packet-switched communication network, Voice over IP terminal or social network profile and said callee alternative communication device is a paired device, coupled device, a device that is capable to be synchronized with other devices based on a user identification, server based managed devices, or manageable devices over cloud.

2. The apparatus according to claim 1, further comprising an encoder, wherein said audio routing information is encoded in an audio signal by means of said encoder.

3. The apparatus according to claim 1, wherein said processing means are configured for generating the non-availability message on the basis of a callee status retrieved from an alternative information source providing information about the callee.

4. The apparatus according to claim 3, wherein the alternative information source comprises an instant messaging service.

5. An apparatus comprising:
the apparatus according to claim 1 and the switching device, wherein said switching device is configured for receiving signalling information from the caller communication terminal, and for processing said signalling information in order to establish a communication between a caller and a callee through said first communication channel.

6. A switching device for routing communications in a communication network through both a first and a second communication channel, the switching device comprising
a communication means configured for receiving signalling information from a caller communication terminal trying to establishing a connection, through the first communication channel, with a callee communication terminal, and
processing means in signal communication with said communication means, the processing means are configured for:
receiving, by means of the communication means, a non-availability message comprising audio routing information generated by an apparatus according to claim 1 when the callee communication terminal is unavailable, wherein said non-availability message provides information for establishing a communication, through the second communication channel, with the callee communication terminal and/or a callee alternative communication device,
establishing a connection, through the second communication channel, between the caller communication terminal and the callee communication terminal and/or the callee alternative communication device on the basis of the received audio routing information.

7. A communication terminal for accessing both a first and a second communication channel, comprising:
a communication means configured for attempting communication with at least a callee communication terminal through the first communication channel, and
processing means in signal communication with said communication means, wherein the processing means are configured for:
receiving a non-availability message comprising audio routing information generated by an apparatus for managing communications when the callee communication terminal is unavailable through the first communication channel, wherein said non-availability message provides information for establishing a communication, through the second communication channel, with the callee communication terminal and/or a callee alternative communication device without input from a user of the caller communication terminal,
establishing a connection, by means of said communication means, with the callee communication terminal and/or the callee alternative communication device through the second communication channel, on the basis of the received audio routing information.

8. The communication terminal according to claim 7, further comprising a decoder, wherein said audio routing information is encoded in an audio signal, and wherein the processing means are configured for decoding said audio routing information by means of said decoder.

9. A method for managing communications in a telecommunication network, said method comprising:
a detecting phase, wherein a communication attempt made by a caller communication terminal, which is trying to establish a connection with a callee communication terminal resulting unavailable through a first communication channel, is detected,
a generation phase, wherein a non-availability message is generated by a processing means,
an output phase, wherein the non-availability message is outputted through output means to a switching device,
wherein the non-availability message outputted during the output phase comprises audio routing information providing information that allows the switching device to establish, without input from the caller communication terminal, a communication between the caller communication terminal and the callee communication terminal and/or a callee alternative communication device through a second communication channel;
wherein said second communication channel is a packet-switched communication network, Voice over IP terminal or social network profile and said callee alternative communication device is a paired device, a coupled device, a device that is capable to be synchronized with other devices based on a user identification, server based managed devices, or manageable devices over cloud.

10. The method according to claim 9, wherein said audio routing information is encoded in an audio signal by means of an encoder.

11. The method according to claim 9, wherein during the generation phase the non-availability message are generated, by the processing means, also on the basis of a callee status retrieved from an alternative information source providing information about the callee.

12. The method according to claim 11, wherein the alternative information source comprises an instant messaging service.

13. A non-transitory computer program product which can be loaded into the memory of an electronic computer, phone or mobile phone, and which comprises portions of software code for executing the phases of the method according to claim 9.

14. An apparatus for managing communications in a telecommunication network, wherein communication terminals are configured for communicating through at least a first channel, the apparatus comprising:
input means adapted for detecting a communication attempt made by a caller communication terminal to establish a connection, through the first communication channel, with a callee communication terminal which is unavailable,
output means adapted for sending at least a non-availability message to a switching apparatus, processing means in signal communication with said input means and said output means, and configured for generating said non-availability message, wherein the non-availability message issued by the output means comprises audio routing information providing information that allows the switching apparatus to automatically establish, without input from the caller communication terminal, a communication between the caller communication terminal and the callee communication terminal and/or a callee alternative communication device through a second communication channel.

\* \* \* \* \*